DIGITAL PHASE LOCKED LOOP

Filed Dec. 27, 1967 2 Sheets-Sheet 1

INVENTORS C. F. KURTH
R. C. MACLEAN
BY R. B. Ardis
ATTORNEY

DIGITAL PHASE LOCKED LOOP

Filed Dec. 27, 1967 2 Sheets-Sheet 2

3,550,132

DIGITAL PHASE LOCKED LOOP

Carl F. Kurth, Andover, Mass., and Roderick C. MacLean, Atkinson, N.H., assignors to Bell Telephone Laboratories, Incorporated, Murray Hill, N.J., a corporation of New York Filed Dec. 27, 1967, Ser. No. 693,967
Int. Cl. H04b *1/58*
U.S. Cl. 343—179 7 Claims

ABSTRACT OF THE DISCLOSURE

An FM digital bilateral transmission system is disclosed comprising transceivers at each end connected by a lossy transmission medium. Each transceiver comprises a digital phase locked loop which converts the received analog modulated carrier to a series of pulses which are representative of the analog modulated carrier.

CROSS REFERENCES TO RELATED APPLICATIONS

The following are related applications: W. B. Gaunt, Jr., Ser. No. 678,398, filed Oct. 26, 1967; C. F. Kurth, Ser. No. 693,904, filed Dec. 27, 1967; C. F. Kurth, Ser. No. 693,905, filed Dec. 27, 1967; C. F. Kurth-F. J. Witt, Ser. No. 694,012, filed Dec. 27, 1967; C. F. Kurth, Ser. No. 693,906, filed Dec. 27, 1967; C. F. Kurth, Ser. No. 693,922, filed Dec. 27, 1967.

BACKGROUND OF THE INVENTION

This invention relates generally to bilateral transmission systems and, more particularly, to bilateral transmission systems employing a transceiver at each end comprising a phase locked loop.

A frequency modulated bilateral transmission system employing a transceiver at each end comprising phase locked loops has been set forth in an application by W. B. Gaunt, Jr., Ser. No. 678,398, filed Oct. 26, 1967. The bilateral transmission system disclosed therein may be utilized where the attenuation suffered by the modulated carrier in the transmission medium is negligible. Where significant attenuation is suffered by the modulated carrier in the transmission medium, the operation of the bilateral transmission system is impaired. This impairment primarily is caused by the change in the loop gain of the phase locked loop as the amplitude of the received modulated carrier changes due to attenuation through the transmission medium.

Where a bilateral transmission system including phase locked loops is to be employed in a medium in which there will be significant attenuation, the attenuation suffered in the transmission medium must either be compensated or the amplitude dependence of the phase locked loop must be eliminated. In a related application by C. F. Kurth, filed concurrently with the present application, Ser. No. 693,905, a bilateral transmission system employing a transceiver at each end comprising essentially a phase locked loop at each end is disclosed which compensates for attenuation suffered by a modulated carrier in transmission medium. The phase locked loop in that system which compensates for attenuation in the transmission medium remains dependent upon the amplitude of the modulated carrier received by the phase locked loop. Due to the inherent loop gain variations that will occur in that system, there will be impairment of the operation of the bilateral transmission system. It would be preferable to provide a transceiver comprising a phase locked loop whose operation is independent of the amplitude of the received modulated carrier.

The present invention, although not limited to such an application, may be used for telephone transmission. At present, there is an increasing demand for additional telephones in areas in which there are already overcrowded telephone lines. These telephone lines extend from a central office to individual subscribers served by the central office. When it is unfeasible to install additional lines in these areas, carrier transmission employing pre-existing lines may be employed. Carrier transmission may also be employed in remote areas if telephone lines exist since they can be used for the modulated carrier. The telephone lines may introduce significant attenuation to the modulated carrier, and the prior Gaunt and related Kurth systems may be incapable of accurate operation for this suggested application.

The bilateral transmission system including phase locked loops at each end may be employed between a central office and a subscriber. A separate digital phase locked loop may be installed at the central office corresponding to a digital phase locked loop for each subscriber. Since the distance between the central office and each subscriber may vary, the attenuation suffered by a modulated carrier through the line will vary. This variation may be compensated at the time of installation by auxiliary equipment and complex installation procedures. It would be preferable, though, to provide a telephone receiver which eliminates the amplitude dependency for reception by the phase locked loop.

An object of the present invention is to provide a transceiver comprising a digital phase locked loop which is capable of accurately receiving a modulated carrier which has passed through a lossy transmission medium.

Another object of the present invention is to provide a transceiver comprising a digital phase locked loop which substantially eliminates the amplitude dependency for reception by the phase locked loop.

Still another object of the present invention is to provide a bilateral transmission system employing a transceiver at each end comprising a digital phase locked loop connected by a lossy transmission medium.

Another object of the present invention is to provide a bilateral transmission system employing a transceiver at each end comprising a digital phase locked loop, where the reception in the bilateral transmission system is independent of the amplitude of the modulated carrier received at the phase locked loop.

SUMMARY OF THE INVENTION

In accordance with the invention, the above objects are accomplished by providing a transceiver comprising a digital phase locked loop. The transceiver receives an analog modulated carrier which, in accordance with one feature of the present invention, is converted to digital form. The received modulated carrier is applied to a level sensor, the output of which is applied to a pulse former. As the amplitude of the received modulated carrier rises above a predetermined level, a pulse is initiated in the pulse former and as the amplitude falls below a predetermined level, the pulse is terminated. In accordance with an additional feature of the present invention, the predetermined levels may be zero volts in order to eliminate the amplitude dependency for reception by the phase locked loop. In accordance with the present invention, a series of pulses is produced by the pulse former which are applied to a digital phase comparator. The phase locked loop includes a voltage controlled oscillator which provides a carrier wave for a signal to be transmitted by the phase locked loop. The output of the oscillator is also supplied to the digital phase comparator after passing through a level sensor and pulse former which convert the analog output of the voltage controlled oscillator to a series of pulses in the same manner as the conversion of the received analog modulated carrier to a digital form. In accordance with another feature of the present invention, the digital phase comparator produces an output which is proportional to the time displacement between respective pulses of the pulse trains applied to the phase comparator. This output is then used to control the frequency output of the voltage controlled oscillator.

In accordance with an aditional feature of the present invention, the above-described digital phase locked loop is employed as a transceiver at each end of a bilateral transmission system. Each digital phase locked loop converts the analog modulated carrier transmitted by the other phase locked loop to a series of pulses, as above described.

DETAILED DESCRIPTION

A frequency modulated bilateral transmission system employing a transceiver at each end comprising a phase locked loop has been described in an application by W. B. Gaunt, Jr., Ser. No. 678,398, filed Oct. 26, 1967. When a modulated carrier in the bilateral transmission system suffers significant attenuation, its operation may be impaired since the loop gain of each phase locked loop will vary. This variation is caused by the amplitude dependence by the loop gain of the phase locked loop. A system disclosed in an application filed concurrently with the present application by C. F. Kurth, Ser. No. 693,905, sets forth a system which compensates for the attenuation suffered by the modulated carrier in the transmission medium. The system set forth therein, while compensating for attenuation, inherently maintains the amplitude dependency for reception by the phase locked loop. The amplitude dependency will cause the loop gain of the phase locked loop to vary. This variation, while significantly less than that found without the suggested compensation attenuator, is still less desirable than a phase locked loop in which the amplitude dependency for reception of the phase locked loop is eliminated.

Figure 1:
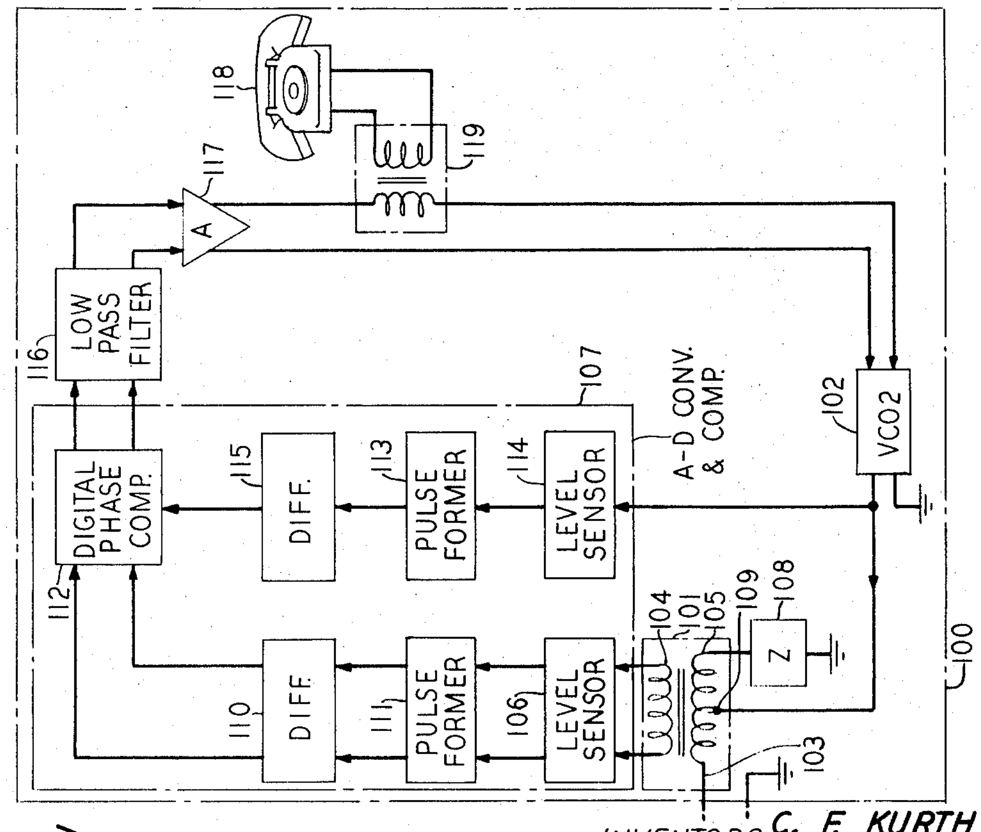
FIG. 1 is a block diagram of a transceiver comprising the digital phase locked loop of the present invention.

FIG. 1 is a block diagram of a transceiver comprising a digital phase locked loop which eliminates the amplitude dependency for reception by the phase locked loop. Transceiver 100 transmits and receives a modulated carrier. Means are provided in transceiver 100 to separate the transmitted from the received modulated carrier. Hybrid 101, which is part of transceiver 100, serves this separation function, insuring that the modulated carrier output of voltage controlled oscillator 102 is transmitted to transmission line 103. A voltage controlled oscillator whose frequency output is linearly proportional to its voltage input may be used in the present invention. An example of a voltage controlled oscillator suitable for use in the present invention may be found on page 67 of "Phase-lock Techniques," written by F. M. Gardner and published by John Wiley & Sons, Inc. in 1966. Hybrid 101 consists of primary winding 104 and secondary winding 105. Primary winding 104 is connected to level sensor 106 which is included as part of the analog to digital converter and digital phase comparator 107. One end of secondary winding 105 is connected to terminating impedance 108. The other end of secondary winding 105 is connected to transmission line 103. Secondary winding 105 is tapped at point 109 which is connected to voltage controlled oscillator 102. Hybrid 101 insures that the output of voltage controlled oscillator 102 received at point 109 is transferred to transmission line 103 and not transferred to primary winding 104. In adition, hybrid 101 insures that the modulated carrier received by transceiver 100 at secondary winding 105 is transferred to primary winding 104 while not being transferred to voltage controlled oscillator 102. Therefore, the hybrid serves to separate the modulated carrier received from that transmitted by transceiver 100.

The modulated carrier received by transceiver 100 is applied to level sensor 106 through hybrid 101. The output of level sensor 106 is connected to differentiator 110 through pulse former 111. Level sensor 106 causes pulse former 111 to initiate a pulse when the level of the modulated carrier received by transceiver 100 crosses a predetermined level and causes pulse former 111 to terminate the pulse when the modulated carrier received by transceiver 100 falls below another predetermined level. Since the signal carried by the carrier received by transceiver 100 causes the modulated frequency to vary, the beginning of each pulse produced by pulse former 111 will vary in accordance with the signal carried by the modulated carrier received by transceiver 100. The output of pulse former 111 is differentiated by differentiator 110 before being applied to digital phase comparator 112.

Voltage controlled oscillator 102 provides a carrier wave for the signal to be transmitted by transceiver 100. The output of voltage controlled oscillator 102 is connected to tapped point 109 of hybrid 101 for transmission through transmission line 103. In addition, the output of voltage controlled oscillator 102 is connected to pulse former 113 through level sensor 114. Level sensor 114 causes pulse former 113 to initiate a pulse when the output of voltage controlled oscillator 102 rises above a predetermined level and terminate the pulse when the output of voltage controlled oscillator 102 falls below a certain level. A series of pulses is produced at the output of pulse former 113 in the same manner as the pulses produced by pulse former 111. The series of pulses produced by pulse former 113 are applied to digital phase comparator 112 through a differentiator 115. Since the initiation of pulses in pulse formers 111 and 113 is dependent upon the instantaneous crossings of predetermined levels by the amplitude of the modulated carrier received by transceiver 100 and the output of voltage controlled oscillator 102, respectively, the time difference between respective pulses of the series of pulses applied to phase comparator 112 by differentiators 110 and 115 will be proportional to the signal carried by the modulated carrier received by transceiver 100. Digital phase comparator 112 produces a series of pulses whose widths are proportional to the signal carried by the modulated carrier received by transceiver 100. This series of pulses is applied through low pass filter 116 and amplifier 117 to utilization device 118 through transformer 119. For purposes of illustration, utilization device 118 is shown to be a telephone transmitter and receiver. The pulses at the output of digital phase comparator 112 include frequency components representing the information signals, the FM carrier and harmonics of the FM carrier. Low-pass filter 116 serves the function of removing all frequency components except those of the information signals to be utilized. The term "utilization device" merely designates any apparatus to which information signals are to be delivered and which produces signals to be modulated and transmitted. The output of amplifier 117 is also, in part, supplied to voltage controlled oscillator 102 to adjust the frequency of its output so that it may more nearly equal the frequency of the modulated carrier received by transceiver 100.

Voltage controlled oscillator 102 provides a carrier wave for the signal to be transmitted by transceiver 100. Utilization device 118 modulates the output of voltage controlled oscillator 102 through transformer 119.This modulated frequency output is transferred to transmission line 103 by hybrid 101.

The transceiver set forth in FIG. 1 eliminates the amplitude dependency for reception by a phase locked loop. This elimination is achieved, in accordance with one feature of the present invention, by converting the received analog modulated carrier to a series of pulses. The initiation of each pulse in the series of pulses is dependent upon the signal carried by the modulated carrier received by transceiver 100 because the modulating signal causes the modulation frequency and, consequently, the crossing of the predetermined level by the modulated carrier, to vary. Digital phase comparator 112 is responsive to the time relationship between respective pulses of the series of pulses it compares and produces a series of pulses whose width varies in response to the time relationship. Level sensor 106 may cause a pulse to be initiated by the pulse former when the level of the modulated carrier rises above zero volts and cause the pulse to be terminated when the level falls below zero volts. By providing that level sensor 106 is sensitive to zero crossings, the pulses produced by the level sensor are independent of the amount of attenuation suffered by the modulated carrier in the transmission medium. Since digital phase comparator 112 operates independently of the amplitude of the modulated carrier received by transceiver 100, the amplitude dependency of the phase locked loop has been eliminated. Elimination of the amplitude dependency improves the operation of the phase locked loop because the loop gain of the phase locked loop will not vary.

Figure 2:
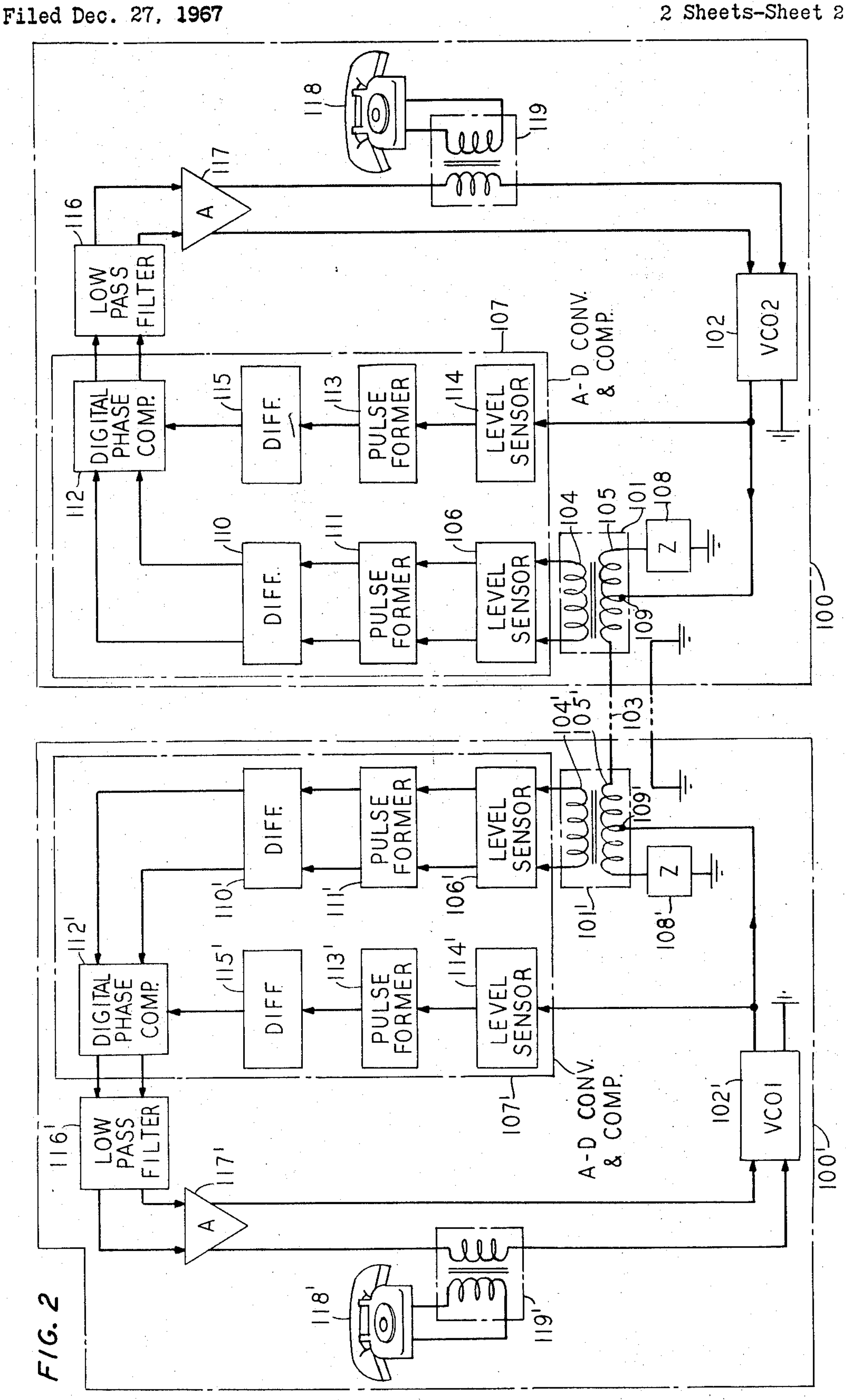
FIG. 2 is a block diagram of a bilateral transmission system employing a transceiver at each end comprising the digital phase locked loop of FIG. 1.

FIG. 2 is a block diagram of a bilateral transmission system comprising a transceiver at each end. Each transceiver comprises the digital phase locked loop described in FIG. 1. As used in the bilateral transmission system of FIG. 2, the operation of the phase locked loop has been described with reference to FIG. 1. Therefore, the numerals of FIG. 1 are primed for one end of the bilateral transmission system to distinguish the two ends of the bilateral transmission system even though the operation of both digital phase locked loops is the same. A detailed description of the operation of each phase locked loop of FIG. 2 would be repetitious since the operation of each phase locked loop as used in the bilateral transmission system has been previously described.

By utilizing a digital phase locked loop at each end as a transceiver, elimination of the amplitude dependency for reception of each phase locked loop is accomplished in accordance with the detailed description of the digital phase locked loop of FIG. 1. The attendant improvements set forth with relation to the digital phase locked loop shown in FIG. 1 are realized in the bilateral transmission system of FIG. 2 employing the digital phase locked loop shown in FIG. 1 at each end.

In the bilateral transmission system of FIG. 2 each voltage controlled oscillator synchronizes with the other since each phase locked loop maintains the frequency output of its voltage controlled oscillator synchronized with the received carrier wave. Since the received carrier wave is provided by the voltage controlled oscillator at the other end of the bilateral transmission system, the voltage controlled oscillators frequency synchronize.

Figure 3:
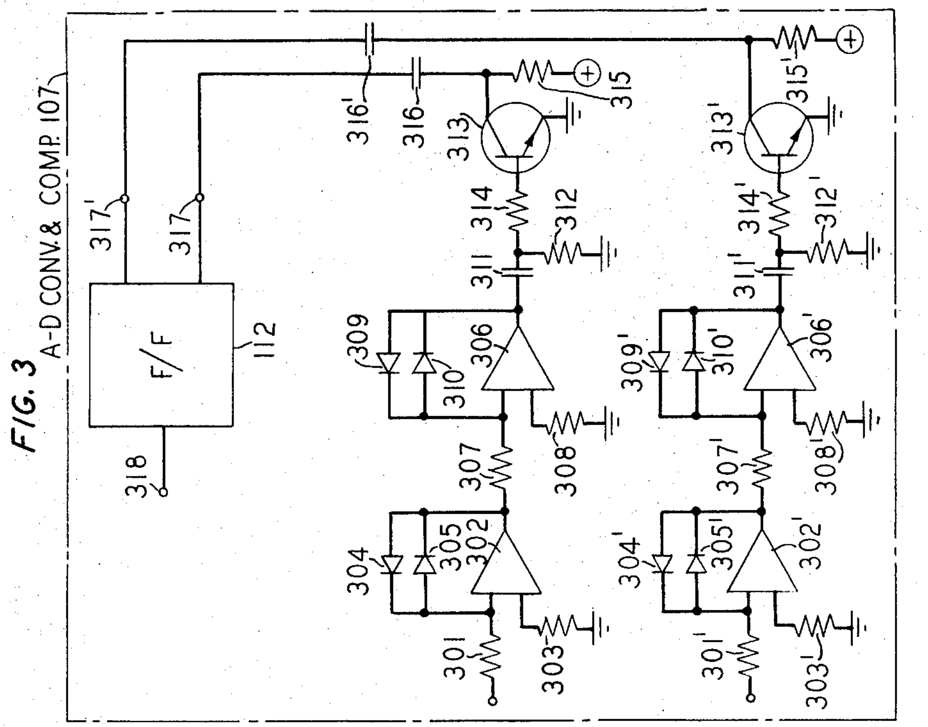
FIG. 3 is a schematic diagram of the analog to digital converter and digital phase comparator that may be used in FIGS. 1 and 2.

FIG. 3 is a schematic diagram of the analog to digital converter and digital phase comparator 107 utilized in FIGS. 1 and 2. The upper and lower portions of the bottom portion of FIG. 3 have the same operation and primed numerals are used for the lower portion to distinguish it from the upper. The description of operation of FIG. 3 will relate to the upper potrion, while the operation of the bottom potrion, designated by primed numbers, will not be set forth since it would be merely repetitious. The modulated carrier received by transceiver 100 is transferred to one end of resistor 301, the second end of which is connected to the input of operational amplifier 302. A reference voltage of zero volts potential is applied to operational amplifier 302 through resistor 303. The anode of diode 304 is connected to the output of operational amplifier 302, while the cathode of diode 304 is connected to the second end of resistor 301. The anode terminal of diode 305 is connected to the second end of resistor 301, while the cathode terminal is connected to the output of operational amplifier 302. As the modulated carrier rises above zero volts, a pulse will be produced at the output of operational amplifier 302 and, as the amplitude of the modulated carrier reecived by transceiver 100 falls below zero volts, the pulse will be terminated at the output of operational amplifier 302. Diodes 304 and 305 limit the output level of operational amplifier 302. Therefore, the modulated carrier received by transceiver 100 will be converted to a series of pulses where each pulse will be initiated as the amplitude of the modulated carrier received by transceiver 100 rises above zero volts and terminated when the amplitude falls below zero volts. In order to insure the accuracy of the analog to digital conversion, a second level sensor and conversion stage is utilized. The output of operational amplifier 302 is connected to a first input terminal of operational amplifier 306 through resistor 307. A reference voltage of zero volts is applied to the second input of operational amplifier 306 through resistor 308. The anode terminal of diode 309 is connected to the output of operational amplifier 306, while the cathode side of diode 309 is connected to the first input terminal of operational amplifier 306. The anode side of diode 310 is connected to the first input terminal of operational amplifier 306, and the cathode terminal of diode 310 is connected to the output of operational amplifier 306. Diodes 309 and 310 limit the amplitude of the output of operational amplifier 306.

The output of operational amplifier 306 is applied to a differentiator comprising capacitor 311 and resistor 312. The output of operational amplifier 306 is applied to one end of capacitor 311, while the other end of capacitor 311 is applied to ground through resistor 312. Differentiation of the pulses produced by operational amplifier 306 increases the accuracy of the conversion since the differentiation further emphasizes the initiation point of each pulse.

The differentiated pulses are then amplified before applied to digital phase comparator 112. Numeral 112 is used in FIG. 3 since it represents the digital phase comparators set forth in FIGS. 1 and 2. The second side of capacitor 311 is connected to the base of NPN transistor 313 through resistor 314. A positive source of reference potential is connected to the collector terminal of NPN transistor 313 through load resistor 314. The collector of NPN transistor 313 is capacitively coupled through capacitor 316 to input terminal 317 of digital phase comparator 112.

The output of voltage controlled oscillator 102 is also converted to a series of pulses and applied to digital phase comparator 112 by the lower circuit designated by primed numerals. The output of voltage controlled oscillator 102 is applied to one end of resistor 301'. The operation of the lower portion of the bottom portion of FIG. 3 is the same as the operation of the upper portion described above.

Digital phase comparator 112 comprises a standard bistable multivibrator (flip-flop). When the converted, differentiated, and amplified pulse derived from the modulated carrier received by transceiver 100 is applied to flip-flop 112 through capacitor 316 at terminal 317 its output at terminal 318 is caused to go positive. When the subsequent converted, differentiated, and amplified output of voltage controlled oscillator 102 is applied to input terminal 317' of flip-flop 112, the output produced at terminal 318 is caused to return to its ground state. Flip-flop 112 will change state each time a positive pulse is applied to either terminal 317 or 317'. Therefore, a pulse will be produced whose width is determined by the time relationship between respective pulses of the pulse trains applied to flip-flop 112 which cause it to change state. Use of a bistable multivibrator which varies between positive potential and ground is arbitrary and any bistable multivibrator may be used with the present invention.

Since the signal carried by the modulated carrier received by transceiver 100 causes the frequency of the modulated carrier to vary, it will cause the zero crossing of the modulated carrier to vary with respect to time. Therefore, the initiation of the pulse output of flip-flop 112 will be determined by this frequency variation. The output pulse width produced at terminal 318 of flip-flop 112 will be proportional to the time difference between the zero crossings of the received modulated carrier and the output of voltage controlled oscillator 102. Provision of the analog to digital conversion and digital phase comparator in the present invention eliminates the amplitude dependency for reception by the phase locked loop and thus, eliminates the loop gain variations attendant in prior phase locked loops which were used as transceivers.

The digital transceiver and phase locked loop have been described as including level sensors and pulse formers. It is to be understood that other arrangements may be devised to perform the analog to digital conversion. Any arrangement which provides means to convert a periodic analog signal to a series of pulses having the same period as the analog singal may be used in the present invention.

It is to be understood that the embodiments of the invention which have been described are merely illustrative of the application of the principles of the invention. Numerous modifications may readily be devised by those skilled in the art without departing from the spirit and scope of the invention.

What is claimed is:

1. A digitalized phase locked loop serving as a transceiver transmitting and receiving a modulated carrier comprising:

oscillating means for producing a first analog signal, the frequency of the first analog signal being proportional to the voltage at the input of said oscillating means, means for applying the first analog signal to a transmission medium, means for receiving a second analog signal from the transmission medium, means responsive to the first analog signal for producing a first pulse signal, the pulses of the first pulse signal occurring whenever the first analog signal rises above a first reference level or falls below a second reference level, means responsive to the second analog signal for producing a second pulse signal, the pulses of the second pulse signal occurring whenever the second analog signal rises above a third reference level or falls below a fourth reference level, means responsive to the first and second pulse signals for linearly producing an information signal proportional to the time displacement between respective pulses of the first and second pulse signals, means for filtering from the information signals all of the component frequencies greater than a cutoff frequency, means for amplifying the unfiltered components of the information signal, means for applying the amplified components of the information signal to a utilization device and to the input of said oscillating means, and means for applying signals from said utilization device to the input of said oscillating means.

2. Apparatus as set forth in claim 1 wherein said first, second, third and fourth reference levels are substantially equal.

3. Apparatus as set forth in claim 1 wherein said utilization device is a telephone transmitter and receiver.

4. A digitalized phase locked loop transceiver as claimed in claim 1 wherein said means for producing a first pulse signal comprises:

a first level sensing means, a first pulse forming means, and a first differentiating circuit, said first level sensing means indicating to said first pulse forming means whenever the first analog signal rises above the first reference level or falls below the second reference level, said first pulse forming means initiating a pulse whenever the first analog signal rises above the first reference level and terminating the pulse whenever the first analog signal falls below the second reference level, and said differentiating circuit taking the time derivative of pulses from said first pulse forming means, said time derivative comprising the first pulse signal, and said means for producing a second pulse signal comprises:

a second level sensing means, a second pulse forming means, and a second differentating circuit, said second level sensing means indicating to said second pulse forming means whenever the second analog signal rises above a third reference level or falls below a fourth reference level, said second pulse forming means initiating a pulse whenever the second analog signal rises above the third reference level and terminating the pulse whenever the second analog signal falls below the fourth reference level, and said second differentiating circuit taking the time derivative of pulses from said second pulse forming means the time derivative from the second differentiating circuit comprising the second pulse signal.

5. Apparatus as set forth in claim 1 wherein said first and second utilization devices are telephone transmitters and receivers.

6. A bilateral transmission system comprising a first phase locked loop transceiver connected by a lossy transmission medium to a second phase locked loop transceiver, said first phase locked loop transceiver transmitting a first analog signal to said second phase locked loop transceiver over said transmission medium and said second phase locked loop transceiver transmitting a second analog signal over said transmission medium to said first phase locked loop transceiver, said first phase locked loop transceiver comprising:

first oscillating means for producing the first analog signal, the frequency of the first analog signal being proportional to the voltage at the input of said first oscillating means, means for applying the first analog signal to said transmission medium, means for receiving the second analog signal from said transmission medium, means responsive to the first analog signal for producing a first pulse signal, the pulses of the first pulse signal occurring whenever the first analog signal rises above a first reference level or falls below a second reference level, means responsive to the second analog signal for producing a second pulse signal, the pulses of the second pulse signal occurring whenever the second analog signal rises above a third reference level or falls below a fourth reference level, means responsive to the first and second pulse signals for linearly producing a first information signal proportional to the time displacement between respective pulses of the first and second pulse signals, means for filtering from the first information signal all of the component frequencies greater than a first cutoff frequency, means for amplifying the unfiltered components of the first information signal, means for applying the amplified components of the first information signal to a first utilization device and to the input of said first oscillating means, and means for applying signals from said first utilization device to the input of said first oscillating means, and said second phase locked loop transceiver comprising:

second oscillating means for producing the second analog signal, the frequency of the second analog signal being proportional to the voltage at the input of said second oscillating means, means for applying the second analog signal to said transmission medium, means for receiving the first analog signal from said transmission medium, means responsive to the second analog signal for producing a third pulse signal, the pulses of the third pulse signal occurring whenever the second analog signal rises above a fifth reference level or falls below a sixth reference level, means responsive to the first analog signal for producing a fourth pulse signal, the pulses of the fourth pulse signal occurring whenever the first analog signal rises above a seventh reference level or falls below an eighth reference level, means responsive to the third and fourth pulse signals for linearly producing a second information signal proportional to the time displacement between respective pulses of the third and fourth pulse signals, means for filtering from the second information signal all of the component frequencies greater than a second cutoff frequency, means for amplifying the unfiltered components of the second information signal, means for applying the amplified components of the second information signal to a second utilization device and to the input of said second oscillating means, and means for applying signals from said second utilization device to the input of said second oscillating means.

7. Apparatus as set forth in claim 6 wherein said first, second, third, fourth, fifth, sixth, seventh and eighth reference levels are substantially equal.

References Cited

UNITED STATES PATENTS

| | | | |
|---|---|---|---|
| 2,363,571 | 11/1944 | Chaffee | 343—179 |
| 3,038,762 | 6/1962 | Beatrice | 328—133X |
| 3,102,164 | 8/1963 | Roiz | 178—69.5 |
| 3,144,606 | 8/1964 | Adams et al. | 325—14X |
| 3,354,398 | 11/1967 | Broadhead, Jr. | 328—133 |

RICHAHRD MURRAY, Primary Examiner

B. V. SAFOUREK, Assistant Examiner

U.S. Cl. X.R.

178—69.5; 179—2.5; 325—17, 58, 63; 328—63, 133; 331—25